E. A. CONNER.
CENTRAL CONNECTING MEMBER FOR HORSE OVERSHOES.
APPLICATION FILED DEC. 9, 1919.
1,416,333.   Patented May 16, 1922.
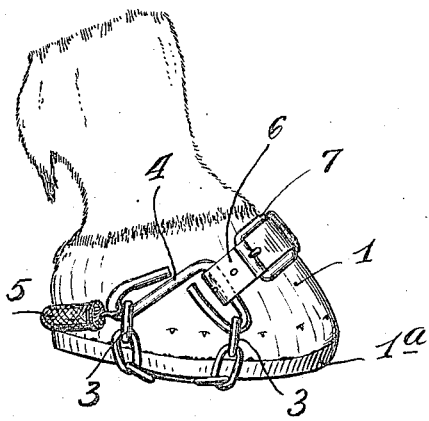
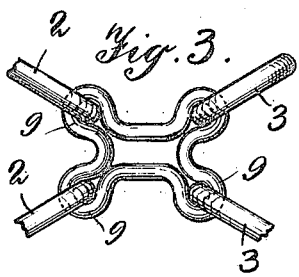
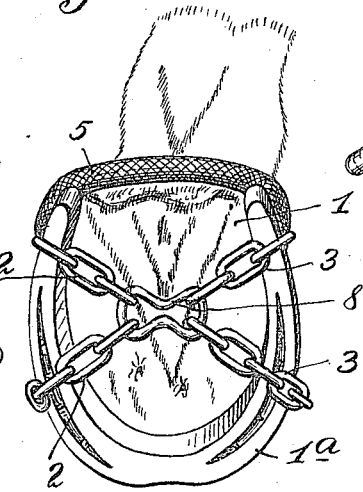
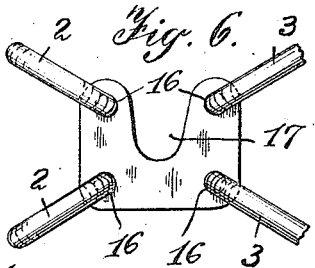
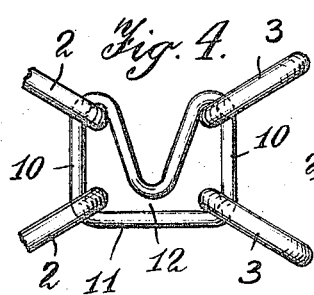
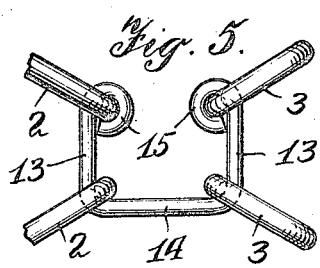
Edward A. Conner  Inventor
By Frederick S. Duncan  Attorney

UNITED STATES PATENT OFFICE.

EDWARD A. CONNER, OF BRIDGEPORT, CONNECTICUT, ASSIGNOR TO AMERICAN CHAIN COMPANY, INC., A CORPORATION OF NEW YORK.

CENTRAL CONNECTING MEMBER FOR HORSE OVERSHOES.

1,416,333.        Specification of Letters Patent.     Patented May 16, 1922.

Application filed December 9, 1919. Serial No. 343,671.

*To all whom it may concern:*

Be it known that I, EDWARD A. CONNER, a citizen of the United States, residing at Bridgeport, in the State of Connecticut, have invented certain new and useful Improvements in Central Connecting Members for Horse Overshoes, of which the following, taken in connection with the accompanying drawings, is a specification.

In any type of chain overshoe for horses, it is highly desirable that the frog of the horse's foot, more especially the rear portion thereof, bear as little as possible of the weight of the animal. In the type of overshoe characterized by two sets of tread members adapted to converge from points on each side of the hoof or horseshoe toward a central area on the bottom of the foot, it is customary to employ a single central member, usually in the form of a link, to span the frog. The converging ends of the tread members are connected to the central link, which is relatively thin, and as it lies beneath the frog when the overshoe is adjusted, the greater part of the weight of the animal is sustained by the tread members. On account of the shape of the base line of the hoof and the limitations imposed by necessary peculiarities of construction of the securing means for the overshoe, the points from which the respective tread members of each set converge, are so near together that the converging ends must be correspondingly near together. The means commonly employed to meet these requirements, consists of an elongated link usually rectangular in shape, which is intended to occupy a position transverse of the symmetrical plane of the hoof, that is, across the frog. While a link of the above description answers the purpose when in the relative position above described, it is in practice open to the objection that, through either ignorance or carelessness of the user, the overshoe may be adjusted with the central link lying longitudinally of the foot, which results in liability to injury of the frog and improper adjustment of the shoe. A link having a regular shape such as that of a square or circle is objectionable for the reason that such a link of sufficient dimensions to span the frog transversely thereof would extend so far back as to lie beneath the rear portion of the frog, which is relatively tender as compared to the forward portion.

The object of my invention is the production of a central connecting member, such that subjection to the tensional stresses normally created by the tread members will cause it to assume its correct position with relation to the remaining parts of the shoe.

Referring to the drawings, Figure 1 is a side view of a horse's foot showing the securing means and a portion of two tread members of a chain shoe thereto attached.

Fig. 2 is a bottom view of a horse's foot, showing the tread members of the type of shoe shown in Figure 1, connected with a central connecting member embodying the preferred form of my invention.

Figs. 3, 4, 5 and 6 are plan views of five modifications of my invention, each connected with end links of tread members of the construction shown in Fig. 2.

Referring to Figs. 1 and 2, a horse's hoof 1 provided with an ordinary horseshoe 1ª is shown equipped with a chain shoe of a well known type comprising in part two series of tread members 2, 2 and 3, 3 respectively, secured to the foot by means of two tension equalizers (of which one only, indicated by 4, is shown), the heel loop 5, strap 6, and buckle 7. To span the frog and to serve as a common connecting member for the converging ends of the tread members, I employ in all the forms illustrated, an elongated link of sufficient length for the purpose and so constructed as to cause the anchorages, or points at which the stresses of at least one of the tread members is applied, to be at all times on the same side of the lesser median line of the link. For example, in the preferred form shown in Fig. 2 the central link 8, which is substantially of figure-8 shape, is constricted centrally of itself and transversely thereof as shown so as to form a neck sufficiently small to prevent the connecting links from moving from one loop of the link to the other. The result is that the connecting points of the tread members of the central link are not shifted to any substantial extent. In other words, as the tread members are placed under their normal stresses, the central link will, as a necessary result, assume a position transverse of the frog.

A similar result is accomplished in each of the modifications. The link of Fig. 3 consists of an elongated rectangular link, constricted intermediate the corners, whereby the link presents anchorages consisting of four substantially closed loops 9, one at each end of the four corners respectively of the rectangle. The loops 9 are linked with ends 2, 2 and 3, 3 of the tread members.

The link of Fig. 4, in form, comprises two ends 10, 10 and one side 11, of a rectangle, the remaining side being bent inwardly centrally of itself to form the constriction 12 which is of insufficient width to permit any end link to pass through it. The form of Fig. 5 likewise comprises two ends 13, 13 and the side 14 of a rectangle, but connecting means for at least two opposing tread members, comprise eyes 15, 15, formed by looping the ends 13, 13 respectively. In the form of Fig. 6 I employ a flat plate provided with four holes 16, situated at the four corners respectively of a rectangle, the holes serving as a means for connecting the end links of the tread members and the side intended to lie rearwardly when adjusted being preferably gouged as at 17.

It will thus be seen that in all of the forms shown, the position of the central link with respect to the remaining parts of the shoe, will be at all times similarly maintained by the normally applied tension of at least one of the tread members.

It is obvious that in the practice of my inventions, modifications in detail may be followed and produced. I do not, therefore, wish to be limited to the details above set forth, but what I wish to secure is set forth in the following claims:—

1. In an anti-slipping overshoe for horses, a tread portion including a plurality of tread members adapted to be arranged to converge from the perimeter of the bottom of the hoof toward the frog, and a common link for joining the ends of said tread members, said link consisting of a loop adapted to span said frog, the terminal links of said tread members being slidably linked with said loop, and a portion of said loop being constricted to confine each of said terminal links to a limited movement on said loop.

2. In an anti-slipping overshoe for horses, a tread portion including a plurality of tread members adapted to be arranged to converge from the perimeter of the bottom of the hoof toward the frog, and a common link for joining the ends of said tread members, said link consisting of an elongated loop adapted to span said frog, the terminal links of said tread members being slidably linked with said loop, and said loop being constricted to give it substantially the form of a figure-8, whereby the movement of said terminal links on said loop is restricted to a definite distance.

3. In an anti-slipping overshoe for horses, a tread portion including a plurality of tread members adapted to be arranged to converge from the perimeter of the bottom of the hoof toward the frog, and a common link with which the ends of said tread members are linked, said common link consisting of an elongated loop adapted to span the frog transversely thereof, and said loop being constricted at an intermediate portion to form a neck too small for any of said terminal links to pass therethrough.

4. In an anti-slipping overshoe for horses, a tread portion including a plurality of tread members adapted to be arranged to converge from the perimeter of the bottom of the hoof toward a common area, and a common link for joining the ends of said tread members, said common link consisting of an elongated loop adapted to span the said area, the terminal links of said tread members being slidably linked with said loop, and a portion of said loop being constricted between said terminal links to form a neck too small for said terminal links to pass therethrough.

In testimony whereof, I have signed this specification.

EDWARD A. CONNER.